United States Patent
Matsubara et al.

(10) Patent No.: US 8,904,234 B2
(45) Date of Patent: Dec. 2, 2014

(54) DETERMINATION OF ITEMS TO EXAMINE FOR MONITORING

(75) Inventors: Masazumi Matsubara, Kawasaki (JP); Atsuji Sekiguchi, Kawasaki (JP); Kuniaki Shimada, Kawasaki (JP); Yuji Wada, Kawasaki (JP); Yasuhide Matsumoto, Kawasaki (JP); Shinji Kikuchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 349 days.

(21) Appl. No.: 13/348,831

(22) Filed: Jan. 12, 2012

(65) Prior Publication Data

US 2012/0246520 A1 Sep. 27, 2012

(51) Int. Cl.
G06F 11/00 (2006.01)
G06F 11/30 (2006.01)
G06F 11/07 (2006.01)

(52) U.S. Cl.
CPC .......... *G06F 11/079* (2013.01); *G06F 11/3006* (2013.01); *G06F 11/0748* (2013.01); *G06F 11/3055* (2013.01)
USPC .................. 714/26; 714/46; 714/57

(58) Field of Classification Search
None
See application file for complete search history.

(56) References Cited

U.S. PATENT DOCUMENTS

| | | | |
|---|---|---|---|
| 5,157,668 A * | 10/1992 | Buenzli et al. | 714/26 |
| 5,655,071 A * | 8/1997 | Habbe et al. | 714/25 |
| 5,761,429 A * | 6/1998 | Thompson | 709/224 |
| 6,690,274 B1 * | 2/2004 | Bristol | 340/506 |
| 7,693,042 B1 * | 4/2010 | Wei | 370/216 |
| 7,818,421 B2 | 10/2010 | Machida | |
| 2002/0054169 A1 * | 5/2002 | Richardson | 345/854 |
| 2002/0113816 A1 * | 8/2002 | Mitchell et al. | 345/734 |
| 2003/0005486 A1 * | 1/2003 | Ridolfo et al. | 800/288 |
| 2004/0139371 A1 * | 7/2004 | Wilson et al. | 714/43 |
| 2006/0029085 A1 * | 2/2006 | Booman et al. | 370/401 |
| 2008/0117068 A1 * | 5/2008 | Sandstrom | 340/635 |
| 2009/0313508 A1 * | 12/2009 | Yan et al. | 714/47 |

FOREIGN PATENT DOCUMENTS

| | | |
|---|---|---|
| JP | 8-044583 A | 2/1996 |
| JP | 2007-004337 A | 1/2007 |
| JP | 2009-289020 A | 12/2009 |

OTHER PUBLICATIONS

Japanese Office Action mailed Oct. 7, 2014 for corresponding Japanese Patent Application No. 2011-068133, with Partial English Translation, 6 pages.

* cited by examiner

*Primary Examiner* — Gabriel Chu
(74) *Attorney, Agent, or Firm* — Fujitsu Patent Center

(57) ABSTRACT

An information processing apparatus monitors one or more apparatuses based on information on multiple items acquired from the apparatuses. Information on an item #3 is associated with information on items #1 and #2. The information processing apparatus examines the information on the item #3. In the case where no failure is detected in the examination of the information on the item #3, the information processing apparatus omits examination of the information on the items #1 and #2. On the other hand, in the case where a failure is detected in the examination of the information on the item #3, the information processing apparatus examines the information on each of the items #1 and #2.

5 Claims, 21 Drawing Sheets

FIG. 6

```
<entities>
  <item id="gid1" type="Service">
   <Service name="serviceA" status="normal"/>
  </item>

<item id="gid2" type="Server">
   <Server name="svr1" status="normal">
     <Cpu id="svr1_c1" type="xxx" status="normal"/>
     <Cpu id="svr1_c2" type="xxx" status="normal"/>
     <Memory id="svr1_m1" size="4GB" status="normal"/>
     <Hdd id="svr1_h1" capacity="1TB" status="normal"/>
   </Server>
  </item>

<item id="gid3" type="Server">
   <Server name="svr2" status="normal">
     <Cpu id="svr2_c1" type="xxx" status="normal"/>
     <Cpu id="svr2_c2" type="xxx" status="normal"/>
     <Memory id="svr2_m1" size="4GB" status="normal"/>
     <Hdd id="svr2_h1" capacity="1TB" status="normal"/>
   </Server>
  </item>

<item id="gid5" type="Application">
   <Application name="app1" status="normal"/>
     <param name="cache" value="2MB"/>
     <param name="config_file" value="c:¥xxx¥config"/>
   </Application>
  </item>
  <item id="gid6" type="Db">
   <Application name="app2"
              transactions ="3000" status="normal"/>
  </item>

<relationship id="gid7" type="consistOf">
   <sourceItem>gid1</sourceItem>
   <targetItem>gid2</targetItem>
  </relationship>

<relationship id="gid9" type="installedOn">
   <sourceItem>gid5</sourceItem>
   <targetItem>gid2</targetItem>
  </relationship>

...

</entities>
```

511

| PROPAGATION RELATIONSHIP TABLE | | | | 521 |
|---|---|---|---|---|
| ID | FAILURE | PARENT FAILURE | CONDITION | |
| S1 | SERVICE FAILURE | — | Service.status=="normal" | |
| S2 | SERVER FAILURE | S1 | Server.status=="normal" | |
| S3 | HDD FAILURE | S2 | Server.Hdd.status!="error" | |
| S4 | MEMORY ERROR | S2 | Server.Memory.status!="error" | |
| S5 | APPLICATION FAILURE | S1 | App.status=="normal" | |
| S6 | SETTING ERROR | S5 | App.params.[ATTR] [OP] [VAL] | |
| S7 | HIGH LOAD | S5 | App.transactions<[VAL] \|\| App.transactions<=[VAL] | |

FIG. 8

| RULE DEFINITION TABLE | | | 411 |
|---|---|---|---|
| ID | RULE | PARENT RULE | |
| R1 | svr1.status=="Normal" | R4 | |
| R2 | app2.transactions<5000 | R4 | |
| R3 | numberOfServers(serviceA)<10 | — | |
| R4 | serviceA.status=="Normal" | — | |

FIG. 9

| REACTION DEFINITION TABLE | | | 211 |
|---|---|---|---|
| ID | CONDITION | REACTION | |
| A1 | R1 OR R3 | DEGRADED OPERATION (serviceA) | |
| A2 | R2 | SERVER ADDITION (serviceA) | |
| A3 | R2 AND R3 | SERVICE STOP (sericeA) | |

FIG. 10

| CLASSIFICATION | ITEM | ATTRIBUTE | RULE |
|---|---|---|---|
| ☐ SERVER | ☐ svr1 | ☒ status | =="Normal" |
|  | ☐ svr2 | ☐ status |  |
| ☐ HDD | ☐ svr1_h1 | ☐ status |  |
|  | ☐ svr1_h2 | ☐ status |  |
| ⋮ | ⋮ | ⋮ | ⋮ |

FIG. 13

```xml
<?xml version="1.0" encoding="UTF-8"?>
<definitions xmlns=··· >

<process id="patch" name="PATCH APPLICATION FLOW">
    <startEvent id="rt_start" />
    <sequenceFlow sourceRef="rt_start" targetRef="PRELIMINARY EXAMINATION" />

<receiveTask id="PRELIMINARY EXAMINATION" name="PRELIMINARY EXAMINATION" />
    <sequenceFlow sourceRef="PRELIMINARY EXAMINATION" targetRef="exgw1"/>

<exclusiveGateway id="exgw1" name="Exclusive Gateway"/>
    <sequenceFlow sourceRef="exgw1" targetRef="cancelFlow">
      <conditionExpression xsi:type="tFormalExpression">
        ${NEXT PROCESS == "CANCEL"}
      </conditionExpression>
    </sequenceFlow>
    <sequenceFlow sourceRef="exgw1" targetRef="rt_precond1">
      <conditionExpression xsi:type="tFormalExpression">
        ${NEXT PROCESS == "NEXT"}
      </conditionExpression>
    </sequenceFlow>

<scriptTask id="rt_precond1" name="Task1" scriptFormat="groovy">
       (CONTENT OF TASK 1)
    </scriptTask>
    <sequenceFlow sourceRef="rt_precond1" targetRef="IN-EXECUTION EXAMINATION 1" />

...

<endEvent id="theEnd" />

<scriptTask id="cancelFlow" name="CancelFlow" scriptFormat="jruby">
       (CONTENT OF CANCEL)
    </scriptTask>
    <sequenceFlow sourceRef="cancelFlow" targetRef="theEnd2" />
    <endEvent id="theEnd2" />

</process>
</definitions>
```

DETERMINATION OF ITEMS TO EXAMINE FOR MONITORING

CROSS-REFERENCE TO RELATED APPLICATION

This application is based upon and claims the benefit of priority of the prior Japanese Patent Application No. 2011-068133, filed on Mar. 25, 2011, the entire contents of which are incorporated herein by reference.

FIELD

The embodiments discussed herein are related to a monitoring method and an information processing apparatus for monitoring one or more apparatuses, and also related to a computer-readable medium which stores a monitoring program for monitoring one or more apparatuses.

BACKGROUND

In the operation of an information processing system, it is sometimes the case that a system administrator of the information processing system determines whether there is a failure in apparatuses, such as servers, storage devices, and communication apparatuses, and takes necessary measures when there is a failure. For example, if a hardware failure is found in an apparatus, the system administrator may stop the apparatus and change the hardware. In addition, if a failure is found in the execution state of software, the system administrator may stop processes of the software and investigate the cause of the failure. Further, if an overload on an apparatus is found, the system administrator may add more resources for information processing.

On the other hand, when the number of apparatuses in the information processing system becomes large, the burden on the system administrator for the monitoring operation is increased. One conceivable way to deal with the burden is for an information processing apparatus for operations management to collect information from monitored target apparatuses and examine the collected information to thereby automatically detect a failure (or a sign of a failure) in an apparatus. When detecting a failure, the information processing apparatus may issue a warning to the system administrator, or may take necessary measures (for example, transmit a stop instruction to an apparatus in a failure state) according to a predetermined processing procedure.

Note that a method has been proposed for determining whether to continue or stop autonomous control by collecting information from management target computers and cross-checking the collected information with stop determination rules in an operations management system which carries out autonomous operation and management of the computers according to a predefined workflow (see Japanese Laid-open Patent Publication No. 2007-4337, paragraphs [0028] and [0030]).

However, an increase in the number of items of information to be collected and examined leads to an increase in the monitoring load. Assume that continuous examination is carried out, with respect to each server, for information on specific items, for example, the status of a hard disk drive (HDD), the status of a memory, and the number of transactions being executed by the server. This causes an increase in the workload of an information processing apparatus for carrying out the examination.

SUMMARY

According to one aspect, there is provided a monitoring method used by an information processing system which monitors one or more apparatuses based on information on a plurality of items acquired from the one or more apparatuses, the monitoring method including: among a first item, a second item, and a third item whose information is associated with the information on the first item and the information on the second item, examining the information on the third item; omitting examination of the information on the first item and the information on the second item in a case where no failure is detected in the examination of the information on the third item; and examining the information on the first item and the information on the second item in a case where a failure is detected in the examination of the information on the third item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a description of configuration information;
FIG. 8 illustrates an example of a propagation relationship table;
FIG. 9 illustrates an example of a rule definition table;
FIG. 10 illustrates an example of a reaction definition table;
FIG. 13 illustrates an example of a rule editing screen;
FIG. 16 illustrates an example of a description of flow information.

DESCRIPTION OF EMBODIMENTS

Figure 1:
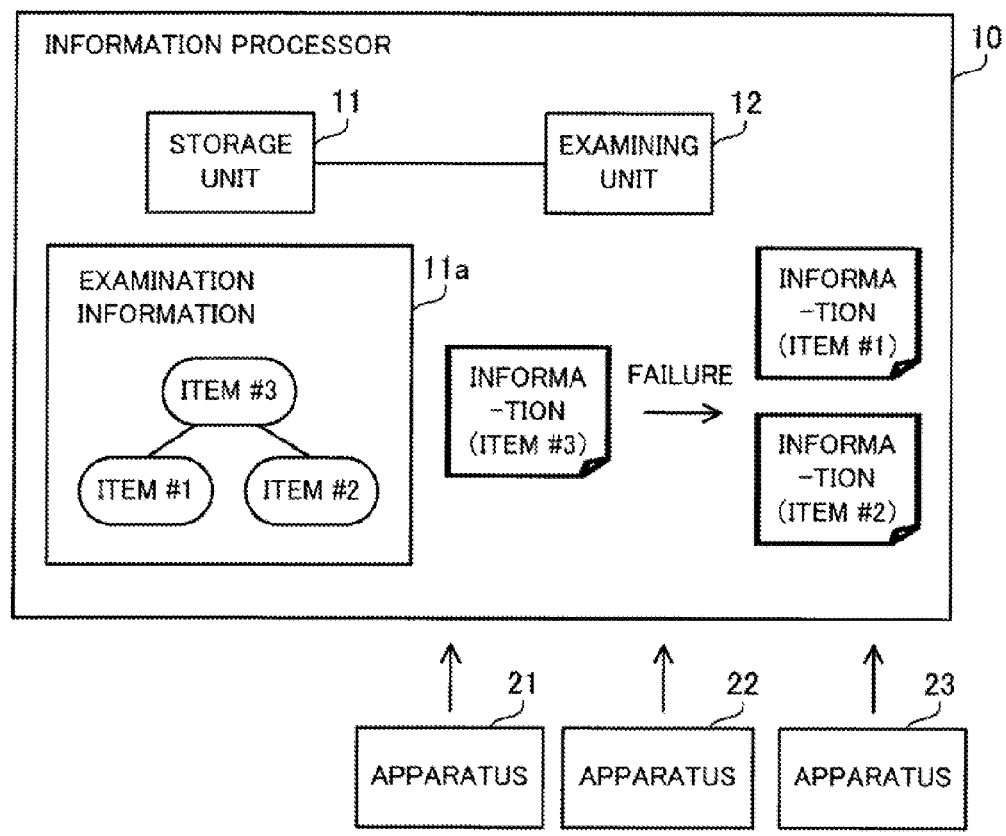
FIG. 1 illustrates an information processing apparatus according to a first embodiment.

Several embodiments will be described below with reference to the accompanying drawings, wherein like reference numerals refer to like elements throughout.

[a] First Embodiment

FIG. 1 illustrates an information processing apparatus according to a first embodiment. An information processing apparatus 10 according to the first embodiment is used in an information processing system for monitoring apparatuses 21 to 23 based on information on multiple items acquired from the apparatuses 21 to 23. The information processing system may monitor whether there is a failure during automatic execution of a process, such as a software update, according to a workflow definition, and then stop the process if there is a failure. The apparatuses 21 to 23 are electronic devices, such as a server, a communication apparatus, and a storage apparatus.

The information processing apparatus 10 includes an examining unit 12. The examining unit 12 may be implemented as a program to be executed using a central processing unit (CPU) and a random access memory (RAM). The examining unit 12 examines information on examination target items indicated by examination information 11a stored in a storage unit 11. The examination information 11a may include information indicating a criterion (determination rule) for determining the normal state (or the presence of a failure) with respect to each of the examination target items. The storage unit 11 may be included in the information processing apparatus 10, or may be a storage device included in another information processing apparatus.

Assume here that, in the examination information 11a, items #1, #2, and #3 among multiple items of information available from the apparatuses 21 to 23 are specified as examination target items. Information acquired for the item #3 is associated with both information on the item #1 and information on the item #2. For example, the information on the item #3 indicates a matter affected by both an apparatus status indicated by the item #1 and an apparatus status indicated by the item #2. In this case, it is considered that the information on the item #3 indicates a failure if at least one of the information on the item #1 and the information on the item #2 indicates a failure.

The examining unit 12 examines the information on the item #3 acquired from the apparatuses 21 to 23. In the case where no failure is detected in the examination of the information on the item #3, the examining unit 12 omits examination of the information on the items #1 and #2. On the other hand, if a failure is detected in the examination of the information on the item #3, the examining unit 12 further examines the information on the items #1 and #2 acquired from the apparatuses 21 to 23. Note that the examining unit 12 may examine the information on the item #3 when the information on the item #3 has been updated. Whether the information on the item #3 has been updated may be monitored by using a database for collecting information from the apparatuses 21 to 23. In addition, the information on the items #1 and #2 may be acquired from the apparatuses 21 to 23 after a failure is detected in the examination of the information on the item #3.

Further, the information processing apparatus 10 or another information processing apparatus may automatically add the item #3 as an examination target item when the items #1 and #2 are specified as examination target items. For example, the item #3 associated with both the items #1 and #2 is retrieved with reference to a storage device that stores relationship information. The relationship information here indicates a relationship among multiple items (for example, a relationship in which information on one item has an effect on information on another item). The information processing apparatus 10 or the other information processing apparatus then specifies the retrieved item #3 as an item for prioritized examination. In this case, the examination information 11a may include information indicating the priority for the examination, in association with the items #1 to #3.

The information processing apparatus 10 according to the first embodiment examines the information of the item #3 among the items #1 and #2 and the item #3 whose information is associated with the information on the items #1 and #2. In the case where no failure is detected in the examination of the information on the item #3, examination of the information on the items #1 and #2 is omitted. On the other hand, in the case where a failure is detected in the examination of the information on the item #3, the information on both the items #1 and #2 is examined. This enables omitting the examination of the information on the items #1 and #2 if there is no failure in the apparatuses 21 to 23, thereby reducing the number of items subject to continuous examination. As a result, it is possible to reduce the load of monitoring which uses information on multiple items.

[b] Second Embodiment

Figure 2:
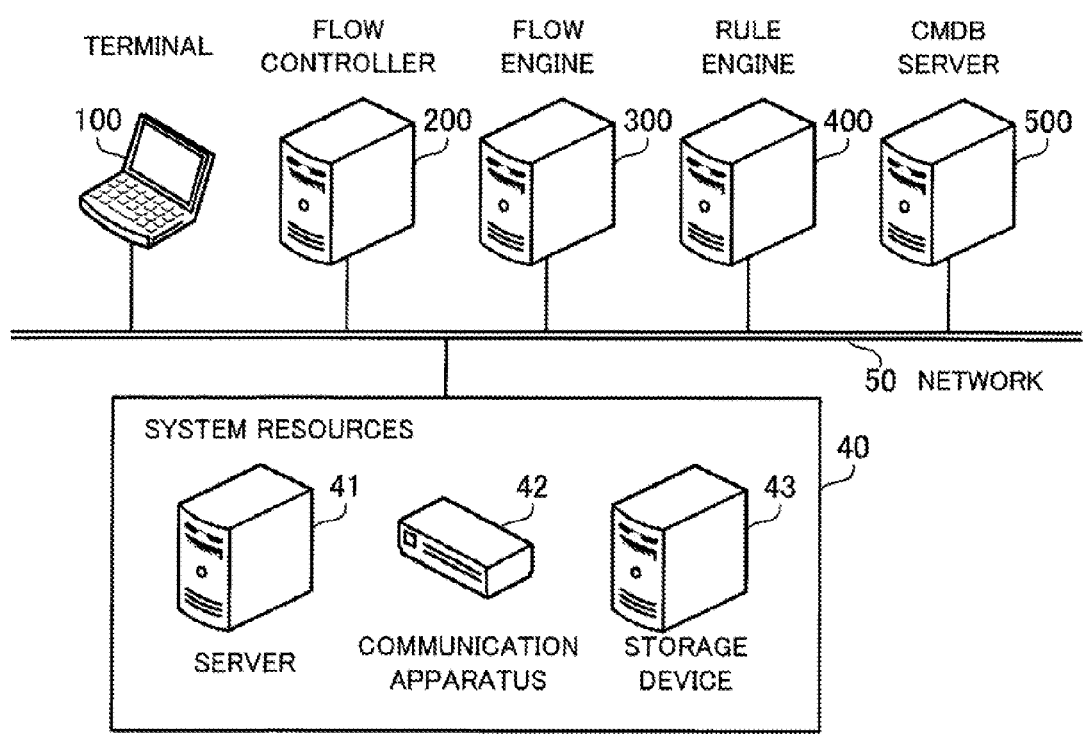
FIG. 2 illustrates an information processing system according to a second embodiment.

FIG. 2 illustrates an information processing system according to a second embodiment. The information processing system according to the second embodiment carries out operations management, such as application of an updated program, with respect to system resources 40 according to a workflow definition. Automation of operations management is sometimes called runbook automation (RBA). The information processing system includes a terminal 100, a flow controller 200, a flow engine 300, a rule engine 400 and a configuration management database (CMDB) server 500. Each apparatus of the information processing system is connected to a network 50. The information processing system is installed, for example, in a data center.

The system resources 40 include various electronic devices used for information processing. For example, the system resources 40 include a server 41, a communication apparatus 42, such as a switch, and a storage device 43. The server 41 executes application software using resources, such as a CPU, a RAM, a hard disk drive (HDD) and the like. The communication apparatus 42 transfers data between apparatuses (for example, between the server 41 and the storage device 43). The storage device 43 stores data to be used for information processing in a nonvolatile storage device, such as a HDD.

The terminal 100 is a computer operated by a user (for example, an administrator of the information processing system). Based on operations of the user, the terminal 100 generates flow information indicating an operations management workflow of the system resources 40, and transmits the flow information to the flow controller 200. In addition, the terminal 100 generates rule information indicating a rule for determining whether there is a failure in the system resources 40 during execution of the workflow, and transmits the rule information to the flow controller 200. In addition, the terminal 100 generates reaction information indicating a correcting process (reaction) taken on the occurrence of a rule violation and registers the reaction information in the flow controller 200.

The flow controller 200 is a computer for controlling the execution of the workflow. The flow controller 200 registers the flow information in the flow engine 300, and causes the flow engine 300 to execute a process defined in the flow information. In addition, the flow controller 200 registers the rule information in the rule engine 400, and causes the rule engine 400 to examine whether a rule violation has occurred. In the case where a rule violation is detected, the flow controller 200 causes the flow engine 300 to execute a process defined in the reaction information, and stops the workflow. The flow controller 200 reports a result of the workflow execution to the terminal 100.

The flow engine 300 is a computer for, in response to an instruction from the flow controller 200, executing a process defined in the flow information with respect to the system resources 40. For example, the flow engine 300 transmits a command, such as a stop command, a command for a program update, and a restart command, to an apparatus of the system resources 40.

The rule engine 400 is a computer for examining whether a rule violation has occurred (whether there is a failure in the system resources 40) during the time the flow engine 300 executes a workflow. The rule engine 400 acquires configuration information of the system resources 40 from the CMDB server 500, and performs rule examination by cross-checking the configuration information and the rule information. In the case of detecting a rule violation, the rule engine 400 reports the rule violation to the flow controller 200.

The CMDB server 500 is a computer functioning as a database server for collecting the configuration information from the system resources 40. The configuration information includes information indicating hardware used by each apparatus of the system resources 40, software being executed by each of the apparatuses, the status of the hardware and software and the like. The configuration information may be collected by the CMDB server 500 periodically making access to each of the apparatuses, or by each of the apparatuses periodically or irregularly (for example, at the time when the configuration information is updated) transmitting the configuration information to the CMDB server 500. The CMDB server 500 provides the rule engine 400 with configuration information to be used for the rule examination. The CMDB server 500 may not collect configuration information not to be used for the rule examination.

Note that multiple functions of the terminal 100, the flow controller 200, the flow engine 300, the rule engine 400, and the CMDB server 500 may be integrated into a single computer. For example, the flow controller 200, the flow engine 300, and the rule engine 400 may be integrated into a single computer.

Figure 3:
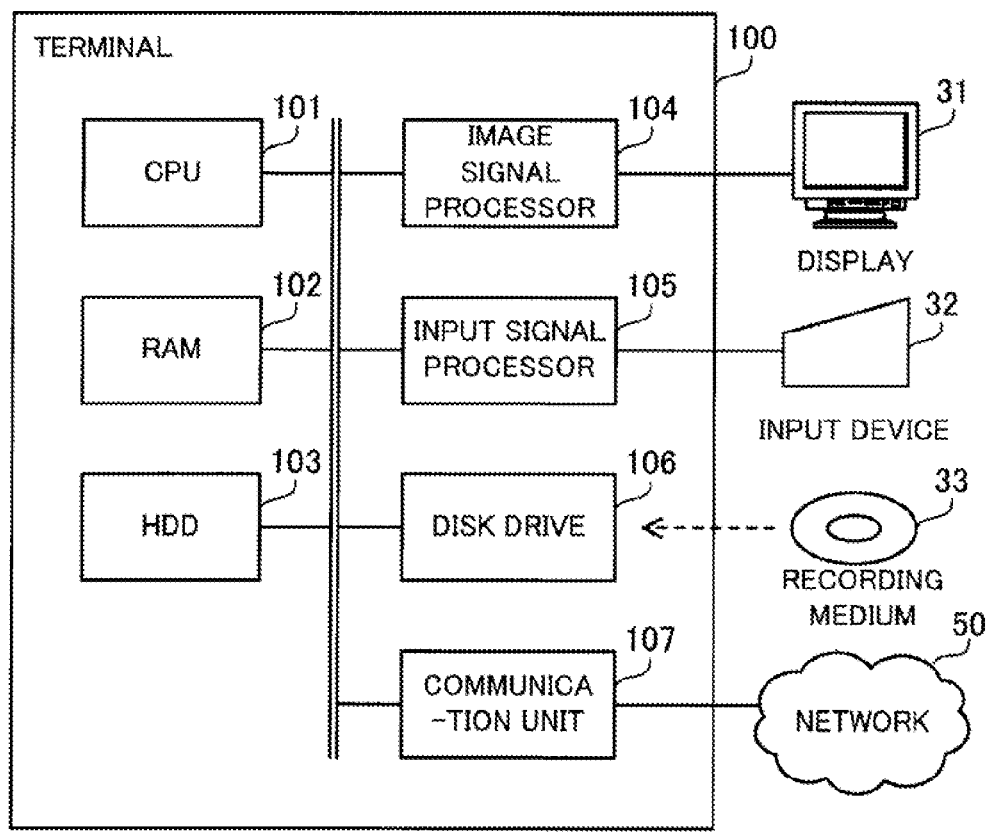
FIG. 3 is a block diagram of exemplary hardware of a terminal.

FIG. 3 is a block diagram of exemplary hardware of the terminal 100. The terminal 100 includes a CPU 101, a RAM 102, a HDD 103, an image signal processor 104, an input signal processor 105, a disk drive 106, and a communication unit 107. These units are connected to a bus inside the terminal 100. Note that each of the server 41 and other apparatuses of the system resources 40, the flow controller 200, the flow engine 300, the rule engine 400 and the CMDB server 500 may be realized by similar hardware to that of the terminal 100.

The CPU 101 is a processing device for controlling information processing in the terminal 100. The CPU 101 runs a program by reading at least a part of programs and data stored in the HDD 103 and deploying the read part in the RAM 102. Note that, the terminal 100 may include multiple processing devices and distribute the information processing across the processing devices.

The RAM 102 is a volatile memory for temporarily storing programs and data to be used by the CPU 101. Note that the terminal 100 may include a different type of memory other than the RAM, or may include multiple memories.

The HDD 103 is a nonvolatile storage device for storing programs, such as an operating system (OS) program and application programs, and data to be used for information processing. The HDD 103 reads from and writes to a built-in magnetic disk according to instructions from the CPU 101. Note that the terminal 100 may include a different type of nonvolatile storage device (for example, a solid state drive (SSD)) other than the HDD, or may include multiple storage devices.

According to an instruction from the CPU 101, the image signal processor 104 outputs an image to a display connected to the terminal 100. As the display 31, a cathode ray tube (CRT) display or a liquid crystal display, for example, may be used.

The input signal processor 105 acquires an input signal from an input device 32 connected to the terminal 100 and outputs the signal to the CPU 101. As the input device 32, a pointing device, such as a mouse and a touch panel, or a keyboard, for example, may be used.

The disk drive 106 is a drive apparatus for reading programs and data recorded in a recording medium 33. The following may be used as the recording medium 33: a magnetic disk, such as a flexible disk (FD); an optical disk, such as a compact disc (CD) and a digital versatile disc (DVD); or a magneto-optical disk (MO). The disk drive 106 stores the programs and data read from the recording medium 33 in the RAM 102 or the HDD 103 according to, for example, instructions from the CPU 101.

The communication unit 107 is a communication interface connected to the network 50 to thereby perform communications. The connection to the network 50 is established using either a wired or wireless connection. That is, the communication unit 107 may be either a wire communication interface or a wireless communication interface.

Figure 4:
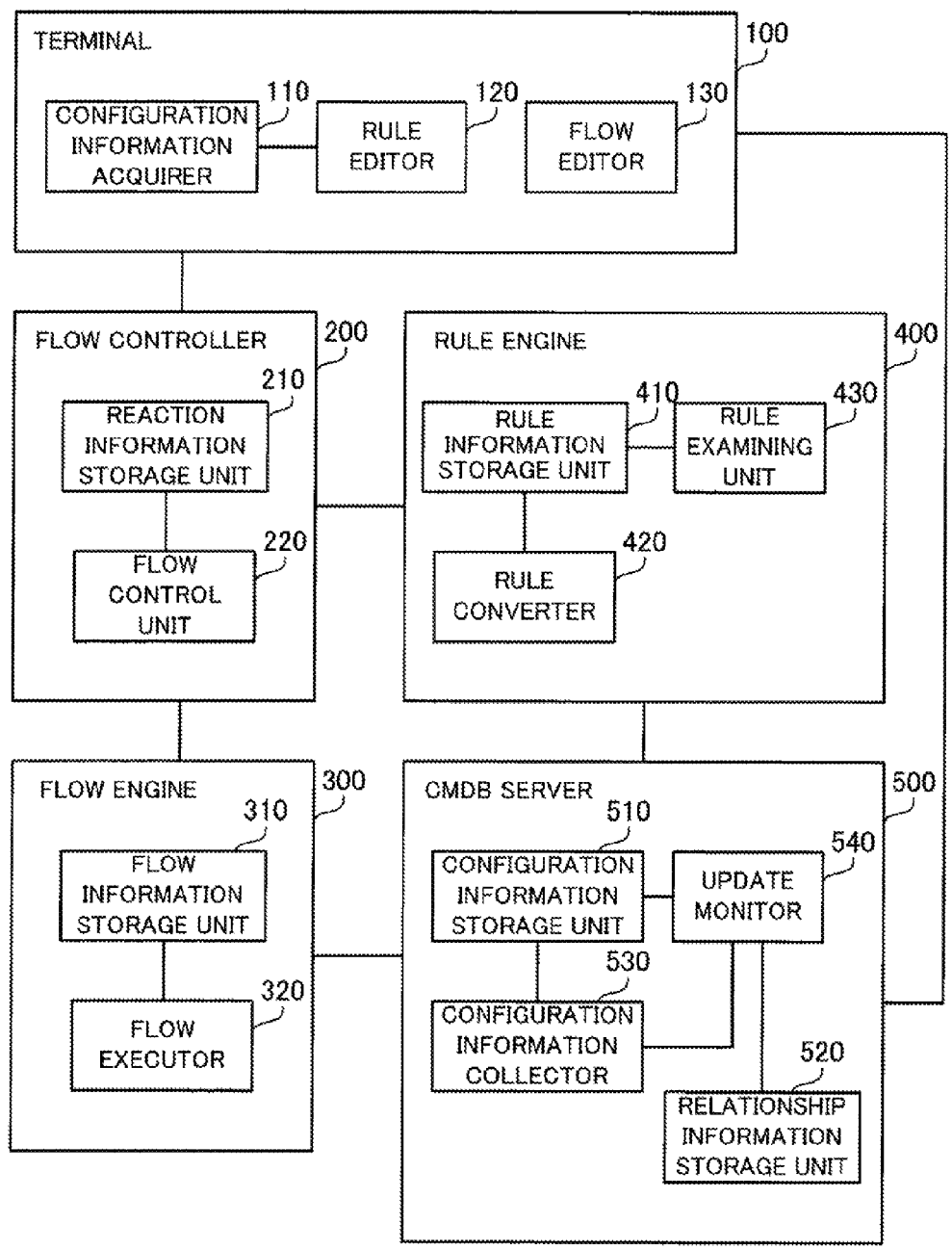
FIG. 4 is a block diagram of exemplary software of the information processing system.

FIG. 4 is a block diagram of exemplary software of the information processing system. Each block may be implemented, for example, as a program module to be executed using a CPU and a RAM.

The terminal 100 includes a configuration information acquirer 110, a rule editor 120, and a flow editor 130. The flow controller 200 includes reaction information storage unit 210 and a flow control unit 220. The flow engine 300 includes flow information storage unit 310 and a flow executor 320. The rule engine 400 includes rule information storage unit 410, a rule converter 420, and a rule examining unit 430. The CMDB server 500 includes a configuration information storage unit 510, relationship information storage unit 520, a configuration information collector 530, and an update monitor 540.

The configuration information acquirer 110 acquires configuration information from the CMDB server 500. Based on the configuration information acquired by the configuration information acquirer 110, the rule editor 120 displays a screen for editing rules on the display. Then, the rule editor 120 generates rule information based on a user's input on the screen and transmits the rule information to the flow controller 200. In addition, the rule editor 120 displays a screen for editing reaction on the display, generates reaction information based on a user's input, and transmits the reaction information to the flow controller 200. The flow editor 130 displays a screen for editing a workflow on the display, generates flow information based on a user's input, and transmits the flow information to the flow controller 200.

The reaction information storage unit 210 stores the reaction information. The flow control unit 220 receives the rule information from the terminal 100, and transfers the rule information to the rule engine 400. In addition, the flow control unit 220 receives the reaction information from the terminal 100, and stores the reaction information in the reaction information storage unit 210. Further, the flow control unit 220 receives the flow information from the terminal 100, and corrects the flow information so that reaction indicated by the reaction information is executed when a rule violation is detected during execution of the workflow. Subsequently, the flow controller 200 transmits the corrected flow information to the flow engine 300. In addition, during execution of the workflow, the flow control unit 220 instructs the rule engine 400 to perform a rule examination, and instructs the flow engine 300 to continue or stop the workflow based on an examination result. Further, the flow control unit 220 reports a result of the workflow execution to the terminal 100.

The flow information storage unit 310 stores the flow information. The flow executor 320 receives the flow information from the flow controller 200, and stores the flow information in the flow information storage unit 310. In addition, based on an instruction from the flow controller 200, the flow executor 320 executes processing (task) of one or more steps indicated by the flow information stored in the flow information storage unit 310. The flow executor 320 transmits a command, such as a stop command, a command for a program update, and a restart command, to the system resources 40. The flow executor 320 may refer to the configuration information held by the CMDB server 500 in order to execute a task, and update the configuration information based on a result of the task execution.

The rule information storage unit 410 stores the rule information. The rule converter 420 receives the rule information from the flow controller 200, corrects the rule information by referring to the configuration information and propagation relationship information held by the CMDB server 500, and stores the corrected rule information in the rule information storage unit 410. In the case where item classifications are described in the rule information in place of items of the configuration information (hereinafter referred to as "configuration item" or "CI"), the rule converter 420 acquires at least part of the configuration information from the CMDB server 500, and develops the item classifications into actually existing items. In addition, in the case where multiple rules are included in the rule information, the rule converter 420 acquires the propagation relationship information from the CMDB server 500, and converts the rules so as to reduce the number of items to be continuously examined (monitoring items). Details of the propagation relationship and the rule conversion are described later.

In response to an instruction from the flow controller 200, the rule examining unit 430 acquires at least part of the configuration information from the CMDB server 500, and examines whether the configuration information violates a rule of the rule information stored in the rule information storage unit 410. Subsequently, the rule examining unit 430 reports an examination result to the flow controller 200. In addition, if receiving an instruction for an automatic examination from the flow controller 200, the rule examining unit 430 registers, in the CMDB server 500, monitoring items selected from the configuration items. Then, when reported by the CMDB server 500 that information on the registered items has been updated, the rule examining unit 430 acquires the information on the registered items from the CMDB server 500 and performs an examination with the information.

The configuration information storage unit 510 stores the configuration information collected from the system resources 40. The relationship information storage unit 520 stores propagation relationship information which indicates a propagation relationship among configuration items. The propagation relationship includes a relationship of failure propagation among configuration items. One example of such a relationship of failure propagation is that, if a failure is detected in an item of "HDD", a failure is also detected in an item of "server" including the HDD.

The configuration information collector 530 collects the configuration information from the system resources 40, and stores the configuration information in the configuration information storage unit 510. In addition, upon request of the terminal 100, the flow engine 300, or the rule engine 400, the configuration information collector 530 transmits at least part of the configuration information stored in the configuration information storage unit 510 to the requestor. Note that the configuration information collector 530 may not continuously collect information on items other than the monitoring items of the rule engine 400. In this case, when a request is made for information on an uncollected item, the configuration information collector 530 collects information on the item from the system resources 40 and transmits the collected information to the requestor.

Upon request of the rule engine 400, the update monitor 540 transmits, to the rule engine 400, the propagation relationship information stored in the relationship information storage unit 520. In addition, when the monitoring items are reported by the rule engine 400, the update monitor 540 instructs the configuration information collector 530 to collect information on at least the reported target items. Then, the update monitor 540 monitors information on the target items stored in the configuration information storage unit 510. When detecting an update of information, the update monitor 540 reports the detection of the update of configuration information to the rule engine 400.

Figure 5:
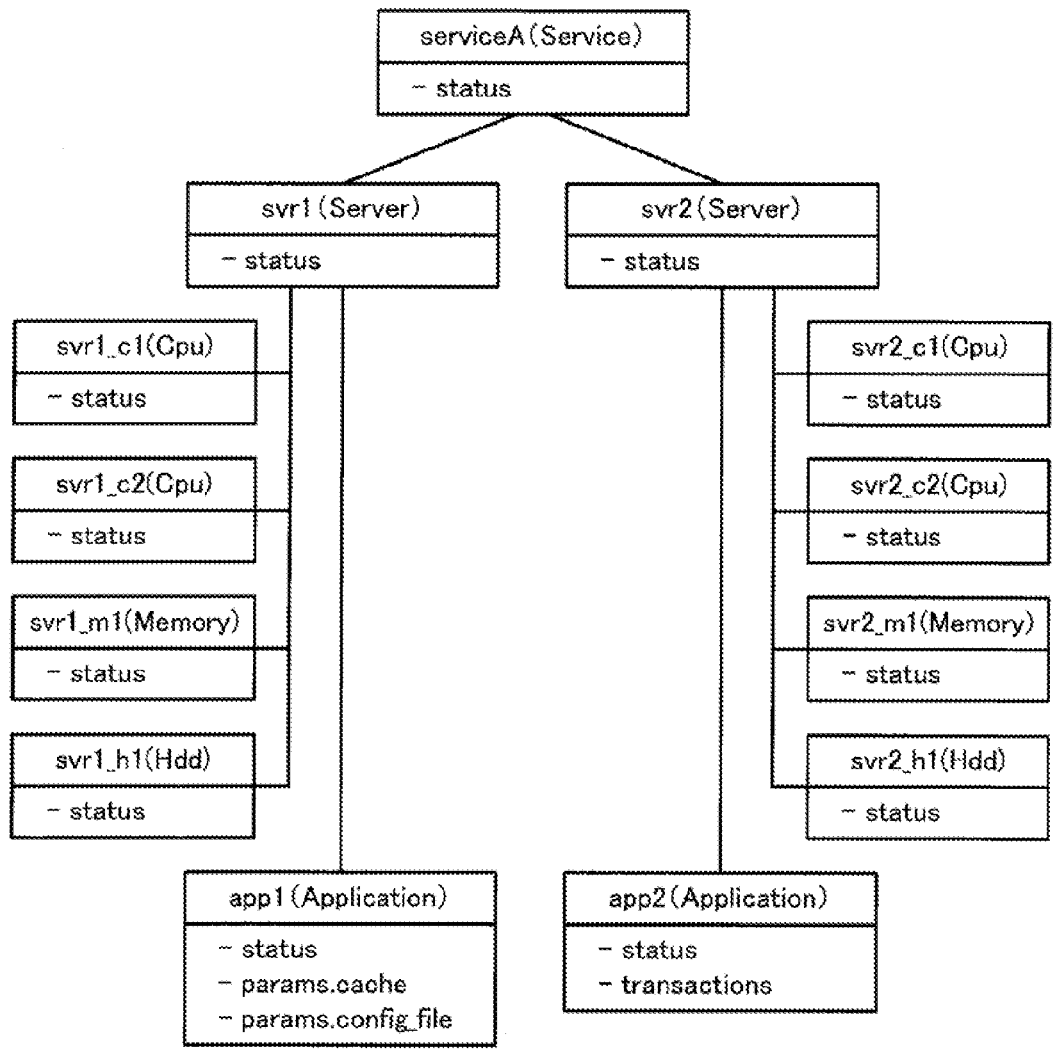
FIG. 5 illustrates examples of configuration items.

FIG. 5 illustrates examples of configuration items. The examples of the configuration information depicted in FIG. 5 include one item "serviceA" whose classification is "Service"; two items "svr1" and "svr2" whose classification is "Server"; and two items "app1" and "app2" whose classification is "Application". Further, the examples of FIG. 5 also include four items "svr1_c1", "svr1_c2", "svr2_c1", and "svr2_c2" whose classification is "Cpu"; two items "svr1_m1" and "svr2_m1" whose classification is "Memory"; and two items "svr1_h1" and "svr2_h1" whose classification is "Hdd".

"serviceA" is provided by two servers "svr1" and "svr2". "svr1" includes two CPUs "svr1_c1" and "svr1_c2", one memory "svr1_m1", and one HDD "svr1_h1". Similarly, "svr2" includes two CPUs "svr2_c1" and "svr2_c2", one memory "svr2_m1", and one HDD "svr2_h1". "app1" is being implemented on "svr1", and "app2" is being implemented on "svr2". For example, "app1" is a Web application, and "app2" is a database management system (DBMS).

Each of the information of "Service", information of "Server", information of "Application", information of "Cpu", information of "Memory", and information of "Hdd", includes information of a status. The information of "Application" may additionally include information of a cache size, information of a path to a configuration file, and information of the number of transactions. The configuration information may include information other than the above.

FIG. 6 illustrates an example of a description of the configuration information. Configuration information 511 illustrated in FIG. 6 describes the items of FIG. 5 in an eXtensible Markup Language (XML) format. The configuration information 511 is stored in the configuration information storage unit 510. The configuration information 511 includes item tags, <item>, and relationship tags, <relationship>.

An item tag indicates a configuration item (i.e., an item of configuration information), and includes a server tag, <Server>, or an application tag, <Application>. The server tag include a CPU tag, <Cpu>, a memory tag, <Memory>, and a HDD tag, <Hdd>. Each of the server tag, application tag, CPU tag, memory tag, and HDD tag corresponds to one of the items illustrated in FIG. 5, and includes, as an attribute, a value indicating a status. In addition, each application tag includes a parameter tag, <param>, indicating a parameter, such as a cache size and a path to a configuration file. Each parameter tag includes a value of a corresponding parameter as an attribute.

A relationship tag indicates a relationship among items indicated by item tags, and includes, as an attribute, a value indicating a type of the relationship. In addition, each relationship tag includes a source item tag, <sourceItem>, and a target item tag, <targetItem>. For example, a relationship tag whose source item is "Service", target item is "Server", and type is "consistOf" indicates a relationship in which "Service" is realized using "Server". In addition, a relationship tag whose source item is "Application", target item is "Server", and type is "installedOn" indicates a relationship in which "Application" is implemented on "Server".

Figure 7:
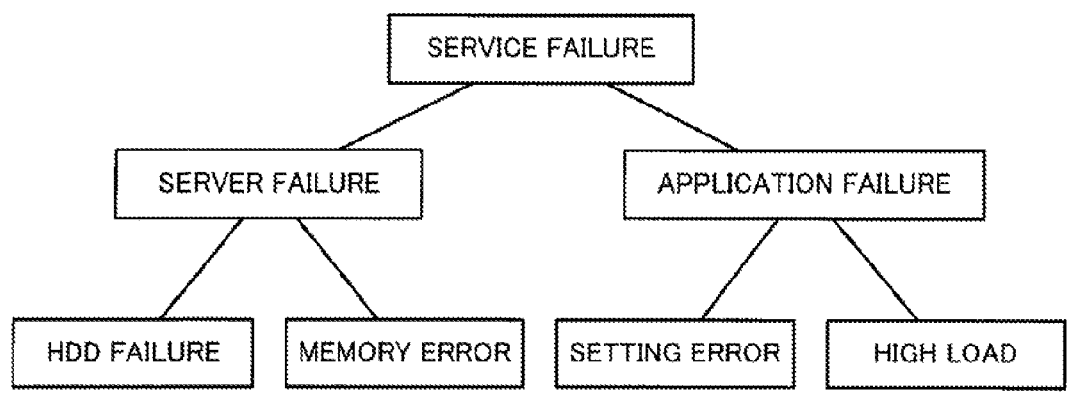
FIG. 7 illustrates an example of a failure propagation relationship.

FIG. 7 illustrates an example of a failure propagation relationship. The propagation relationship is a relationship of failure propagation among items of the configuration information, and has a propagation direction. For example, "HDD failure" and "memory error" lead to "server failure". "Setting error" and "high load" lead to "application failure". "Server failure" and "application failure" lead to "service failure". Accordingly, in the configuration information, when the status of an "Hdd" item indicates an error, it is considered that the status of a corresponding "Server" item also indicates an error. In addition, when the status of a "Server" item indicates an error, the status of a corresponding "Service" item also indicates an error. Thus, the status of a higher-level item is affected by the status of a lower-level item.

FIG. 8 illustrates an example of a propagation relationship table. The example of the propagation relationship table of FIG. 8 corresponds to the propagation relationship depicted in FIG. 7. A propagation relationship table 521 is stored in the relationship information storage unit 520. The propagation relationship table 521 includes items of "ID", "failure", "parent failure", and "condition".

The item "ID" is identification information used for identifying each failure. The item "failure" indicates a failure factor, such as a service failure. The item "parent failure" indicates another failure directly affected by a corresponding failure. For example, the parent failure of "HDD failure" is "server failure", and the parent failure of "server failure" is "service failure". The item "condition" takes the form of a formula for determining, from the configuration information, whether there is a status failure, and is described using an item classification name (such as "Service"). In the example of FIG. 8, each condition is described in the form of a logical expression which results in TRUE when no status failure is present (normal). However, the condition may be described in the form of a logical expression which results in TRUE when a status failure is present. Note that, in FIG. 8, [ATTR] indicates an arbitrary parameter name, [OP] indicates an arbitrary operator, and [VAL] indicates an arbitrary fixed value.

FIG. 9 illustrates an example of a rule definition table. A rule definition table 411 is generated by the rule converter 420, and then stored in the rule information storage unit 410. The rule definition table 411 includes items of "ID", "rule", and "parent rule".

The item "ID" is identification information used for identifying each rule. The item "rule" is described in a formula for determining, from the configuration information, whether there is a failure, and uses an item name (such as "serviceA") in the description. In the example of FIG. 9, each rule is described in the form of a logical expression which results in TRUE when no failure is present (normal). However, the rule may be described in the form of a logical expression which results in TRUE when a failure is present. The item "parent rule" indicates another rule assumed to similarly detect a failure when a failure is detected based on a corresponding rule (i.e., there is a rule violation).

In the example of FIG. 9, the parent rule of rules R1 and R2 is a rule R4. When there is a violation of at least one of the rules R1 and R2, it is assumed that there would also be a violation of the rule R4. On the other hand, in the case where there is no violation of the rule R4, it is assumed that there would also be no violation of the rules R1 and R2. Accordingly, examination using the rules R1 and R2 can be omitted. Note that the user of the terminal 100 needs to define only the rules R1, R2, and a rule R3, as described later. The rule R4 is automatically added by the rule converter 420 based on the rules R1 and R2.

FIG. 10 illustrates an example of a reaction definition table. A reaction definition table 211 is stored in the reaction information storage unit 210. The reaction definition table 211 includes items of "ID", "condition", and "reaction".

The item "ID" is identification information used for identifying each reaction. The item "condition" indicates a condition for a corresponding reaction to be carried out. For example, "R1 OR R3" indicates a condition in which a violation of at least one of the above-mentioned rules R1 and R3 is detected. In addition, "R2 AND R3" indicates a condition in which a violation of both the above-mentioned rules R2 and R3 is detected. The item "reaction" indicates a specific movement of a corresponding reaction. Reactions are defined, such as stopping a service and adding a server to be used for providing a service.

Figure 11:
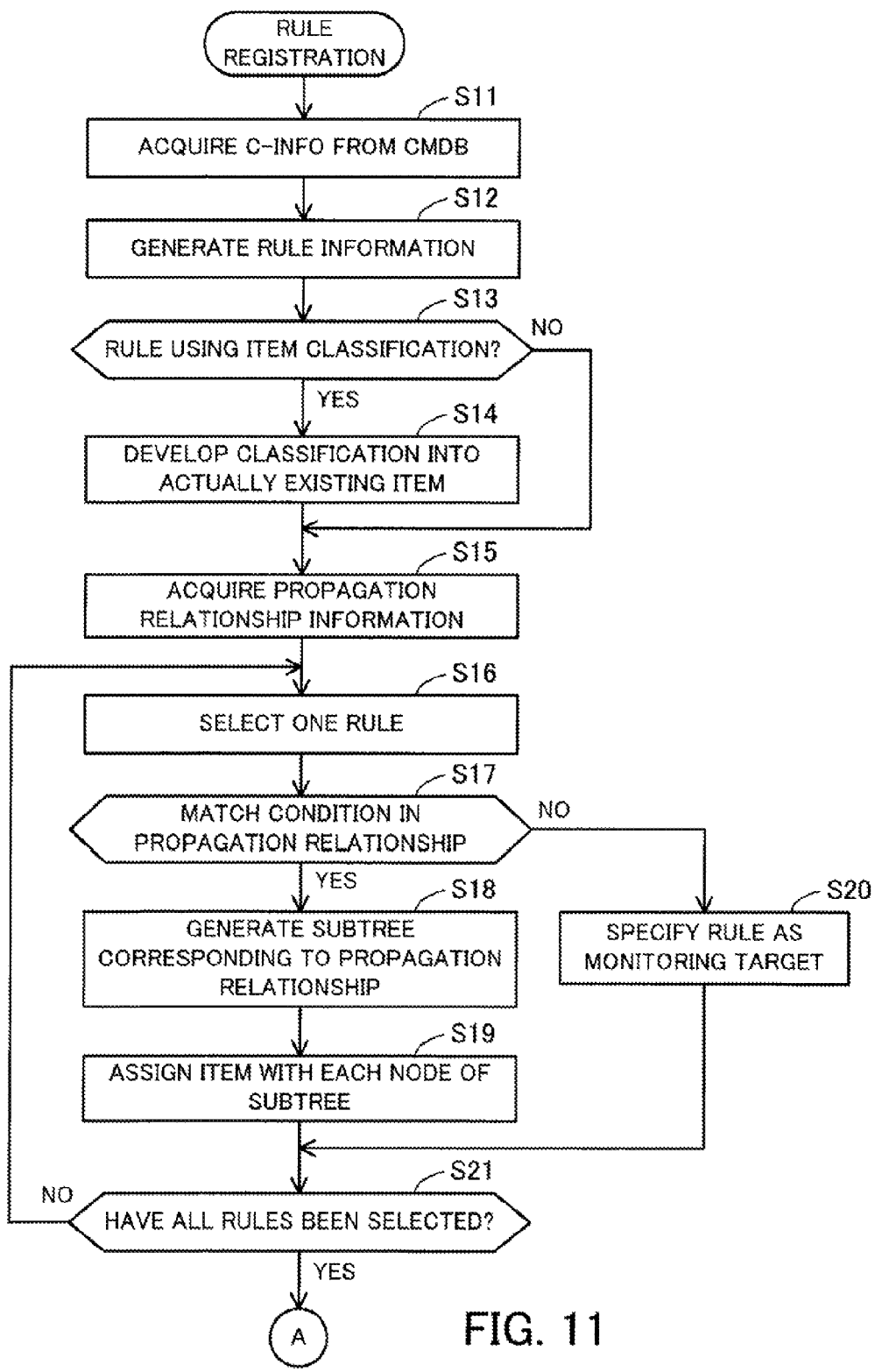
FIG. 11 is a flowchart illustrating a rule registration process.

Next described is a process of registering rules in the information processing system. FIG. 11 is a flowchart illustrating a rule registration process. Hereinbelow, the process of FIG. 11 is described according to the step numbers.

(Step S11) The configuration information acquirer 110 of the terminal 100 accesses the CMDB server 500 to acquire the configuration information (denoted as "C-INFO" in FIG. 11) 511.

(Step S12) Based on the configuration information 511 acquired in Step S11, the rule editor 120 of the terminal 100 generates a rule editing screen which allows selection of an actually existing item or an item classification to thereby enable a user to input a rule, and displays the rule editing screen on the display. Then, the rule editor 120 generates rule information which indicates the rule input by the user, and transmits the rule information to the flow controller 200. The flow control unit 220 of the flow controller 200 transfers the rule information received from the terminal 100 to the rule engine 400.

(Step S13) The rule converter 420 of the rule engine 400 determines whether the rule information received from the flow controller 200 includes a rule described using an item classification. Whether an item classification is included in a rule may be determined with reference to the configuration information 511 held by the CMDB server 500. In the case where an item classification is included, the process proceeds to Step S14. In the case where no item classification is included, the process proceeds to Step S15.

(Step S14) The rule converter 420 accesses the CMDB server 500 to acquire the configuration information 511. Then, based on the configuration information 511, the rule converter 420 develops the item classification included in the rule information into an actually existing item.

(Step S15) The rule converter 420 accesses the CMDB server 500 to acquire the propagation relationship table 521.

(Step S16) The rule converter 420 selects one rule included in the rule information received from the flow controller 200 in Step S12.

(Step S17) The rule converter 420 determines whether the rule selected in Step S16 matches any of the conditions described in the propagation relationship table 521 acquired in Step S15. At the time of the determination, the rule converter 420 compares the rule with the condition by replacing an item included in the rule with a corresponding classification. The replacement of the item with the classification may be performed by referring to the configuration information 511. When there is a matched condition, the process proceeds to Step S18. When there is no matched condition, the process proceeds to Step S20.

(Step S18) The rule converter 420 generates a subtree of a tree structure (tree structure as illustrated in FIG. 7) defined by the propagation relationship table 521. The generated subtree includes a path between a node corresponding to the condition matched in Step S17 and a root node. For example, in the case where the rule selected in Step S16 matches the condition of "server failure" (S2), a subtree is generated in such a manner as to include a node corresponding to "service failure" (S1) and a node corresponding to "server failure" (S2).

(Step S19) With reference to the configuration information 511, the rule converter 420 associates an item with each node of the subtree generated in Step S18. For example, in the case where the rule selected in Step S16 includes the server item "svr1", the rule converter 420 associates the server item "svr1" with the node of "server failure" (S2) and the service item "serviceA" with the node of "service failure" (S1). Then, the process proceeds to Step S21.

(Step S20) The rule converter 420 specifies the rule selected in Step S16 as a monitoring rule (i.e., a rule having no parent rule).

(Step S21) The rule converter 420 determines whether all rules included in the rule information have been selected in Step S16. In the case where all rules have been selected, the process proceeds to Step S22. In the case where there is a rule which has not been selected, the process moves to Step S16.

Figure 12:
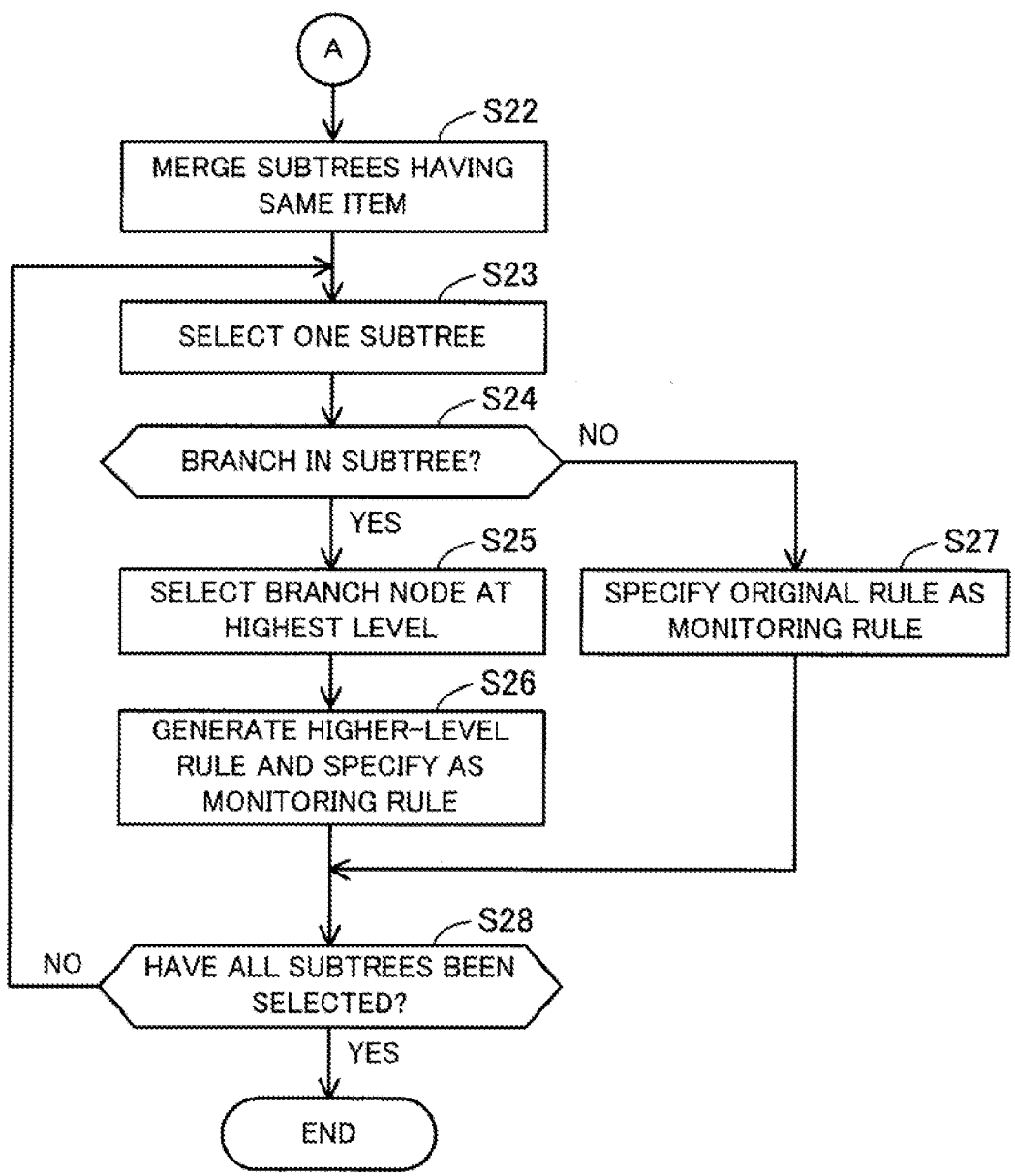
FIG. 12 is a flowchart illustrating the rule registration process, continued from FIG. 11.

FIG. 12 is a flowchart illustrating the rule registration process, continued from FIG. 11.

(Step S22) The rule converter 420 searches the generated subtrees to see whether there are two or more subtrees including a node having the same failure factor and the same item. If such two or more subtrees are found, the rule converter 420 merges the two or more subtrees into one subtree.

(Step S23) The rule converter 420 selects one subtree from an integrated subtree formed by the merger in Step S22.

(Step S24) The rule converter 420 determines whether there is a branch (i.e., whether multiple leaf nodes are included) in the subtree selected in Step S23. In the case where there is a branch (i.e., multiple leaf nodes are included), the process proceeds to Step S25. In the case where there is no branch (i.e., only one leaf node is included), the process proceeds to Step S27.

(Step S25) Within the subtree selected in Step S23, the rule converter 420 selects, among nodes of branch sources, one located at the highest level (i.e., among nodes that cover all leaf nodes, one located at the lowest level).

(Step S26) From the propagation relationship table 521 acquired in Step S15, the rule converter 420 acquires a condition corresponding to the node selected in Step S25. Then, the rule converter 420 replaces an item classification included in the condition with an item associated with the selected node to thereby generate a higher-level rule. The rule converter 420 specifies the generated rule as a monitoring rule. Subsequently, the process proceeds to Step S28.

(Step S27) The rule converter 420 specifies, as a monitoring rule, a rule corresponding to a leaf node of the subtree selected in Step S23 (i.e., an original rule included in the rule information received from the flow controller 200).

(Step S28) The rule converter 420 determines whether all subtrees have been selected in Step S23. In the case where all the subtrees have been selected, the rule converter 420 stores, in the rule information storage unit 410, the specified monitoring rule and the rule definition table 411 including the original rule, and then ends the process. In the case where there is a subtree which has not been selected, the process moves to Step S23.

FIG. 13 illustrates an example of the rule editing screen. Based on the configuration information held by the CMDB server 500, the terminal 100 generates a rule editing screen 121 for assisting rule creation. The rule editing screen 121 is displayed on, for example, the display 31. The rule editing screen 121 includes columns for "classification", "item", "attribute", and "rule".

In the classification column, classifications, such as "server" and "HDD", are described. In the item column, actually existing items included in the configuration information are described for each classification. The user is able to select a classification or an item of an examination target. Selecting a classification is treated as selecting all of actually existing items corresponding to the selected classification. For example, if the classification "server" is selected, it is treated as selecting both the items "svr1" and "svr2" corresponding to the classification "server". In the attribute column, attributes included in the configuration information are described. In the rule column, a formula with respect to a corresponding attribute may be input. The user specifies one or more attributes corresponding to the selected classification or item and inputs a formula for each of the specified attributes.

Figure 14:
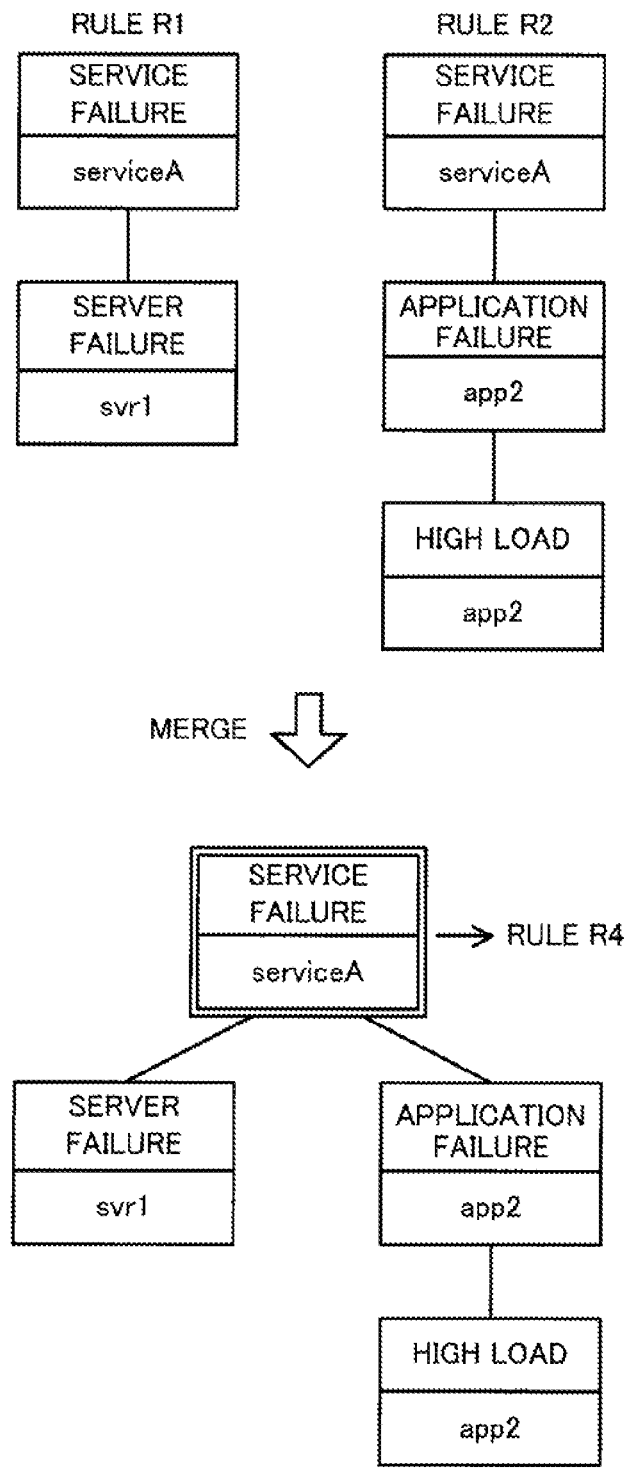
FIG. 14 illustrates an example of a rule conversion.

FIG. 14 illustrates an example of a rule conversion. Assume here that the rules R1 and R2 of FIG. 9 are included in the rule information generated at the terminal 100. Based on the rule R1, the rule engine 400 generates a subtree including a "server failure" node and a "service failure" node. The item "svr1" is associated with the "server failure" node, and the item "serviceA" related to the item "svr1" is associated with the "service failure" node. In addition, based on the rule R2, the rule engine 400 generates a subtree including a "high load" node, an "application failure" node, and a "service failure" node. The item "app2" is associated with the "high load" node, the item "app2" is associated with the "application failure" node, and the item "serviceA" is associated with the "service failure" node.

In the above-mentioned two subtrees, the root nodes have the same failure factor ("service failure") and item ("serviceA"). Accordingly, the rule engine 400 merges the two subtrees into one. Within the merged subtree, the rule engine 400 selects a branch node located at the highest level, namely, in this example, the "service failure" node. Then, the rule engine 400 generates the rule R4, which corresponds to the "service failure" node, and specifies the rule R4 as a rule to be used for a continuous examination (i.e., monitoring rule). In this case, the original rules R1 and R2 are not specified as monitoring rules.

Figure 15:
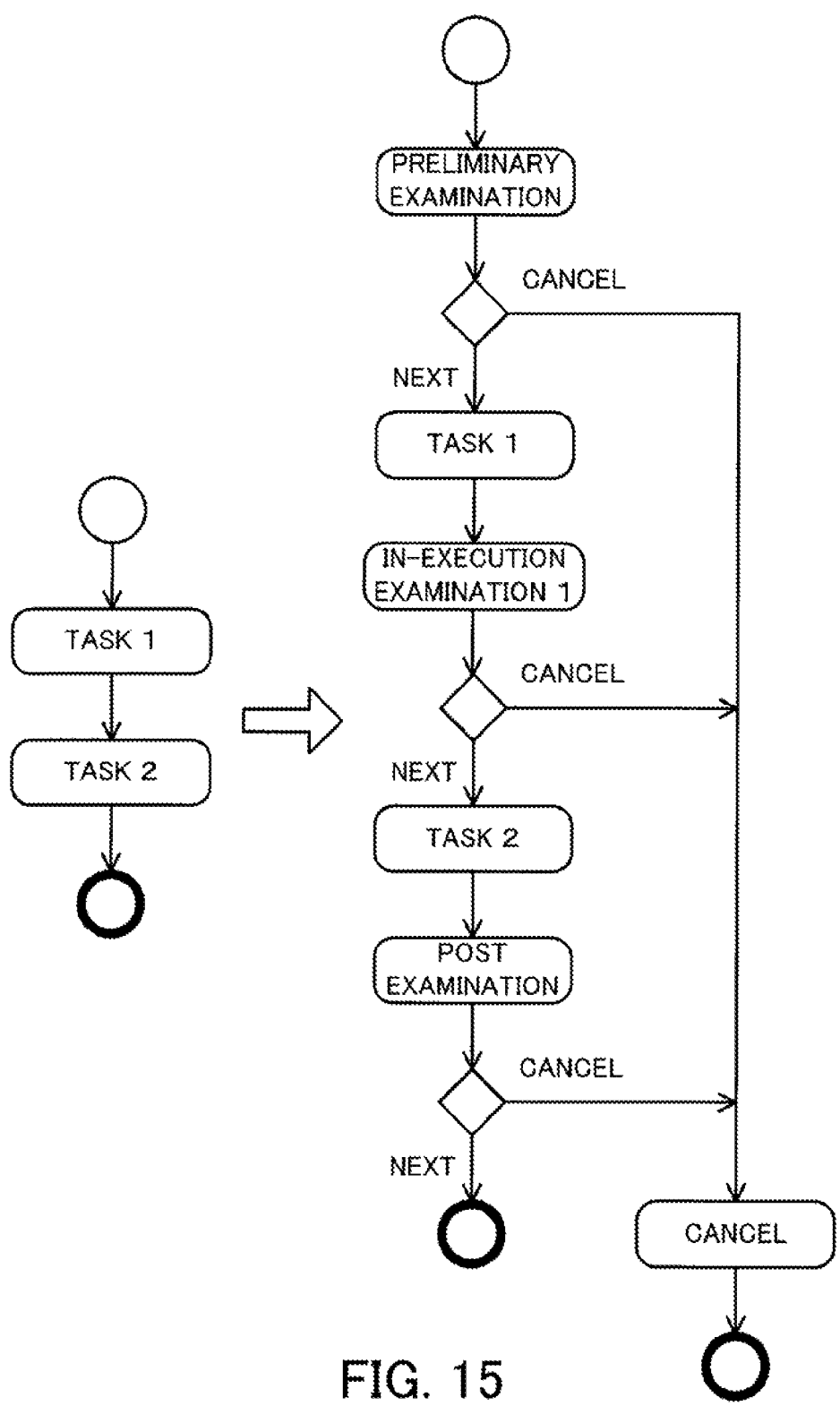
FIG. 15 illustrates an example of a workflow.

Next described is a process of registering a workflow in the information processing system. FIG. 15 illustrates an example of a workflow. The flow controller 200 corrects the flow information received from the terminal 100 in such a manner that a rule examination is performed in the middle of the workflow. Then, the flow controller 200 registers the corrected flow information in the flow engine 300.

Assume here that flow information indicating a workflow for sequentially executing tasks 1 and 2 is generated at the terminal 100. The flow controller 200 inserts an examination task of a preliminary examination before the first normal task (task 1), and inserts an examination task of a post examination after the last normal task (task 2). In addition, the flow controller 200 inserts an examination task of an in-execution examination (in-execution examination 1) between consecutive normal tasks (in this case, between the tasks 1 and 2). Further, the flow controller 200 inserts, after each examination task, a branch corresponding to a result of the examination, and corrects inter-task transitions in such a manner that a transition is made to a normal task of stopping the workflow (cancel) in the case where a rule violation is detected.

FIG. 16 illustrates an example of a description of the flow information. Flow information 311 illustrated in FIG. 16 describes the corrected workflow of FIG. 15 in an XML format. The flow information 311 is stored in the flow information storage unit 310 of the flow engine 300. The flow information 311 includes, with respect to each workflow, a tag <process> with an attribute of a workflow name. In addition, the flow information 311 includes, with respect to each examination task, a tag <receiveTask> with an attribute of an examination task name, and also includes, with respect to each normal task, a tag <scriptTask> with an attribute of a normal task name. Further, the flow information 311 includes a tag <exclusiveGateway> corresponding to a branch and a tag <sequenceFlow> indicating an inter-task transition or a transition between a task and a branch.

Figure 17:
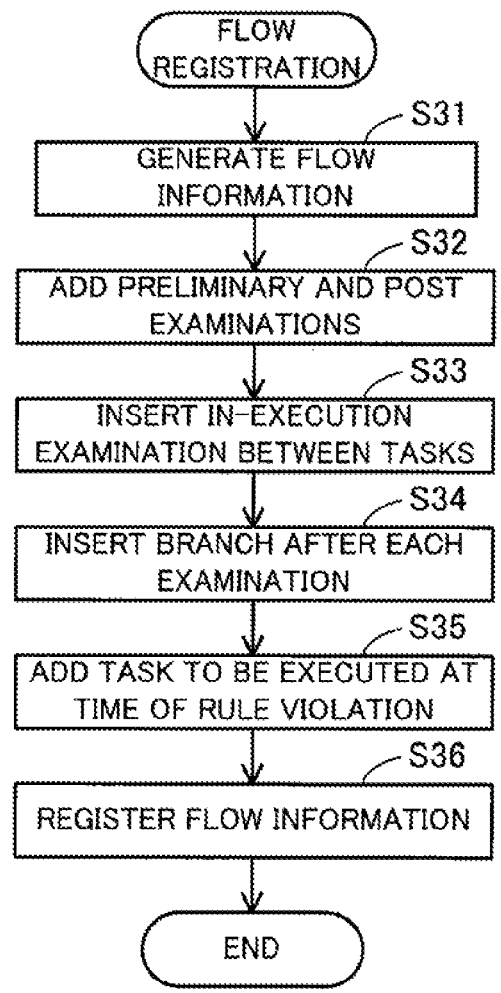
FIG. 17 is a flowchart illustrating a flow registration process.

FIG. 17 is a flowchart illustrating a flow registration process. Hereinbelow, the process of FIG. 17 is described according to the step numbers.

(Step S31) In response to an input from the user, the flow editor 130 of the terminal 100 generates flow information indicating a workflow and including no examination tasks. Then, the flow editor 130 transmits the flow information to the flow controller 200.

(Step S32) The flow controller 220 of the flow controller 200 adds examination tasks of a preliminary examination and a post examination to the workflow indicated by the flow information received from the terminal 100.

(Step S33) The flow controller 220 inserts, in the workflow indicated by the flow information, an examination task of an in-execution examination between consecutive normal tasks.

(Step S34) The flow controller 220 inserts, in the workflow indicated by the flow information, a branch after each examination task.

(Step S35) The flow controller 220 adds, to the workflow indicated by the flow information, a normal task to be executed in the case where a rule violation is detected in each examination task. In addition, the flow controller 220 adds a transition from the branch inserted in Step S34 to the normal task.

(Step S36) The flow controller 220 transmits the corrected flow information to the flow engine 300. The flow executor 320 of the flow engine 300 stores the flow information received from the flow controller 200 in the flow information storage unit 310.

Figure 18:
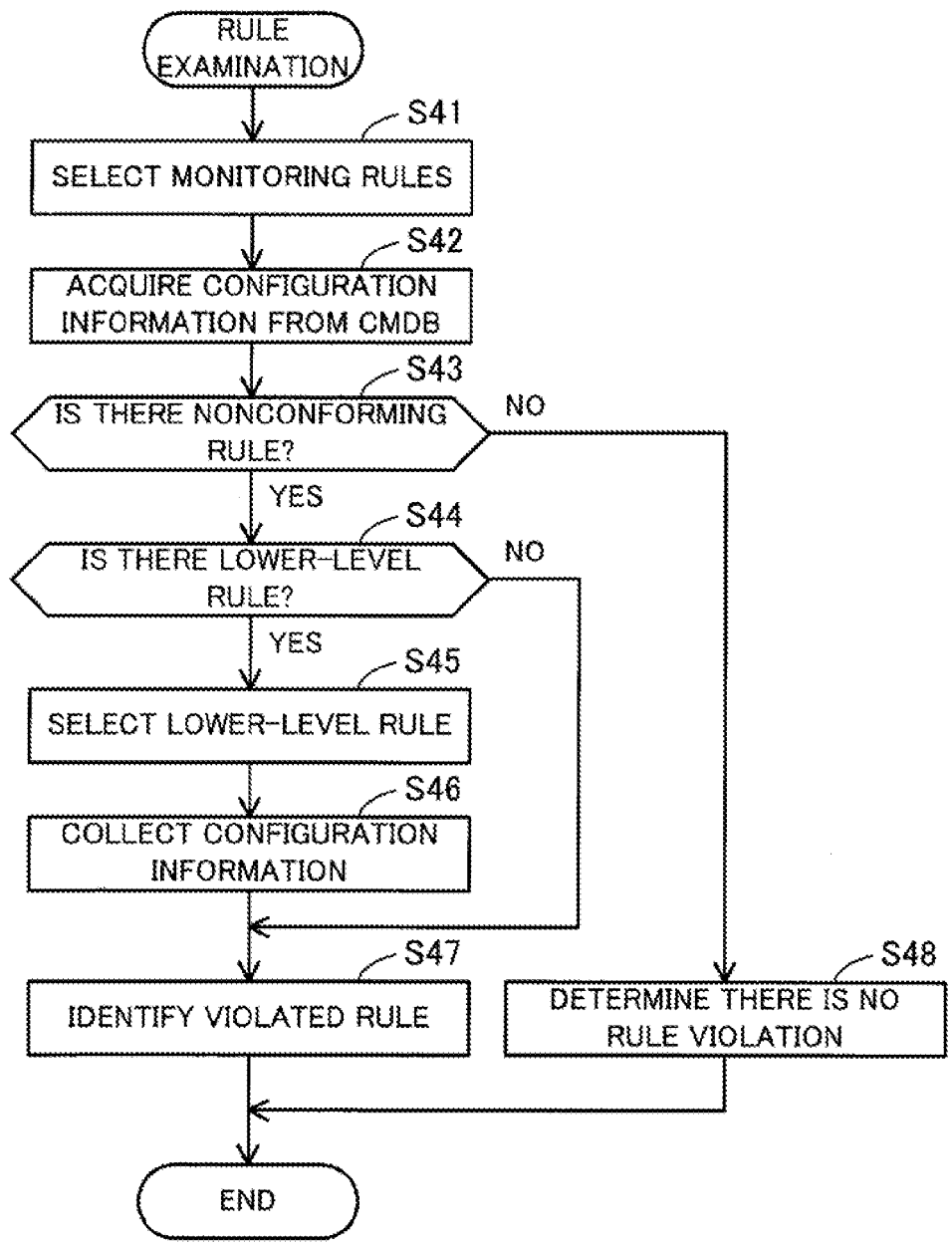
FIG. 18 is a flowchart illustrating a rule examination process.

Next described is a rule examination process performed during execution of a workflow. FIG. 18 is a flowchart illustrating the rule examination process.

Hereinbelow, the process of FIG. 18 is described according to the step numbers.

(Step S41) The rule examining unit 430 of the rule engine 400 selects monitoring rules (i.e., rules having no parent rule) from rules which have been registered in the rule definition table 411 stored in the rule information storage unit 410.

(Step S42) The rule examining unit 430 acquires, from the CMDB server 500, configuration information of items included in the rules selected in Step S41.

(Step S43) The rule examining unit 430 evaluates the selected rules using the configuration information acquired in Step S42 and determines whether there is a nonconforming rule (for example, whether a corresponding logical expression results in FALSE). In the case where there is at least one nonconforming rule, the process proceeds to Step S44. In the case where there is no nonconforming rule, the process proceeds to Step S48.

(Step S44) The rule examining unit 430 refers to the rule definition table 411 to determine whether the nonconforming rule has a lower-level rule (i.e., whether there is a rule having the nonconforming rule as its parent rule). In the case where at least one nonconforming rule has a lower-level rule, the process proceeds to Step S45. In the case where the nonconforming rule has no lower-level rule, the process proceeds to Step S47.

(Step S45) The rule examining unit 430 selects the lower-level rule of the nonconforming rule from rules which have been registered in the rule definition table 411.

(Step S46) The rule examining unit 430 requests, from the CMDB server 500, configuration information of items included in the rule selected in Step S45. The configuration information collector 530 of the CMDB server 500 collects the requested configuration information from the system resources 40 and transmits the configuration information to the rule engine 400. Note that in the case where the requested configuration information has been collected, the configuration information collector 530 transmits the configuration information stored in the configuration information storage unit 510. The rule examining unit 430 evaluates the rule selected in Step S45 using the acquired configuration information.

(Step S47) The rule examining unit 430 determines that there is a rule violation and identifies a rule against which a violation is detected. Then, the rule examining unit 430 reports the violated rule to the flow controller 200. Subsequently, the process ends.

(Step S48) The rule examining unit 430 determines that there is no rule violation. In the case of having started the rule examination based on an instruction from the flow controller 200, the rule examining unit 430 reports to the flow controller 200 that there is no rule violation.

For example, in the case where the rule definition table 411 of FIG. 9 is stored in the rule information storage unit 410, the rule examining unit 430 examines the item "serviceA" based on the rules R3 and R4. In the case where a violation of the rule R3 is detected, the rule examining unit 430 determines that a violation takes place only against the rule R3 because the rule R3 has no low-level rules. On the other hand, in the case where a violation of the rule R4 is detected, the rule examining unit 430 examines the items "svr1" and "app2" based on the lower-level rules R1 and R2. Then, the rule examining unit 430 identifies all rules, including lower-level rules, against which violations are detected.

Next, execution control of workflows is described with reference to three sequence diagrams of FIGS. 19 to 21.

Figure 19:
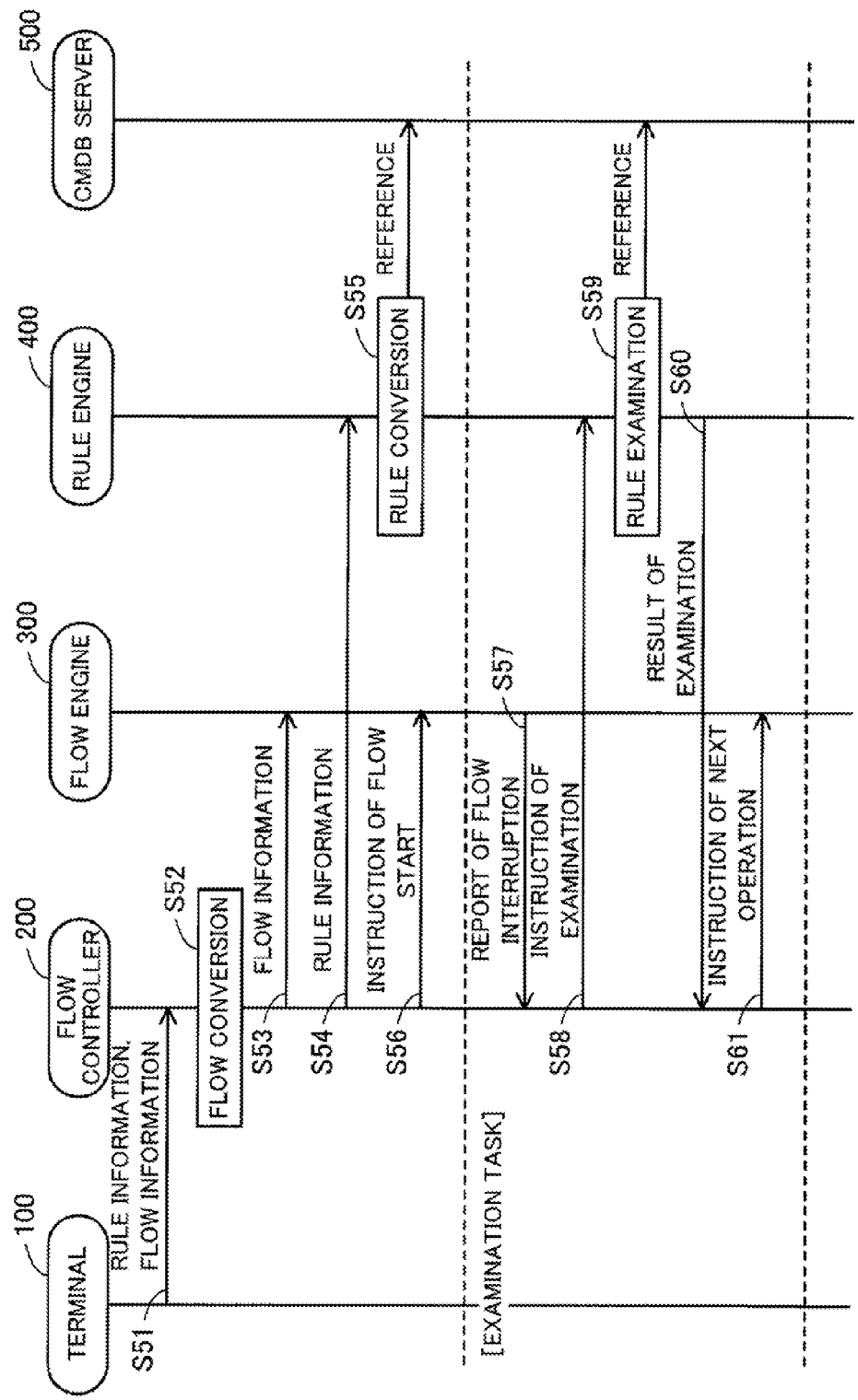
FIG. 19 is a first sequence diagram illustrating an example of an execution procedure of a workflow.

FIG. 19 is a first sequence diagram illustrating an example of the execution procedure of a workflow. In FIG. 19, Steps S51 to S56 are performed at the start of the workflow, and Steps S57 to S61 are performed at the time of executing an examination task defined in the workflow.

(Step S51) The terminal 100 generates rule information and flow information, which are transmitted to the flow controller 200.

(Step S52) The flow controller 200 corrects the flow information received from the terminal 100 and converts the workflow so that a rule examination is performed. At the time of the workflow conversion, the flow controller 200 may refer to the reaction information which has been registered.

(Step S53) The flow controller 200 transmits the flow information corrected in Step S52 to the flow engine 300. The flow engine 300 stores the flow information received from the terminal 100.

(Step S54) The flow controller 200 transfers the rule information received from the terminal 100 to the rule engine 400.

(Step S55) The rule engine 400 develops, into items, item classifications described in the rule information received from the flow controller 200. In addition, the rule engine 400 corrects the rule information by adding rules in such a manner as to reduce the number of monitoring rules (rules used for a continuous examination). At this time, the rule engine 400 refers to the configuration information and the propagation relationship information held by the CMDB server 500, and then stores the corrected rule information.

(Step S56) After confirming completion of registration of the flow information and the rule information, the flow controller 200 instructs the flow engine 300 to start the workflow. The flow controller 200 sequentially executes tasks described in the flow information.

(Step S57) In the case where a task to be executed next is an examination task (a preliminary examination, an in-execution examination, or a post examination), the flow engine 300 interrupts the workflow and reports the interruption to the flow controller 200.

(Step S58) The flow controller 200 instructs the rule engine 400 to perform an examination of the configuration information based on the rule information.

(Step S59) The rule engine 400 acquires the configuration information from the CMDB server 500 and evaluates monitoring rules using the configuration information. In the case where a violation of a monitoring rule is detected, the rule engine 400 also evaluates lower-level rules of the monitoring rule.

(Step S60) The rule engine 400 reports a result of the examination acquired in Step S59 to the flow controller 200. In the case where a rule violation is detected, the rule engine 400 also reports identification information of the rule against which a violation has been found to the flow controller 200.

(Step S61) Based on the examination result reported by the rule engine 400, the flow controller 200 instructs the flow engine 300 on the next operation. When instructing the flow engine 300 on the next operation, the flow controller 200 may refer to the reaction information which has been registered. For example, when a rule violation is not detected, the flow controller 200 transmits "NEXT" (flow continuation). On the other hand, when a rule violation is detected, the flow controller 200 transmits "CANCEL" (flow termination). The flow engine 300 resumes the interrupted workflow, and determines a branch direction described in the flow information in accordance with the instruction of the flow controller 200.

Figure 20:
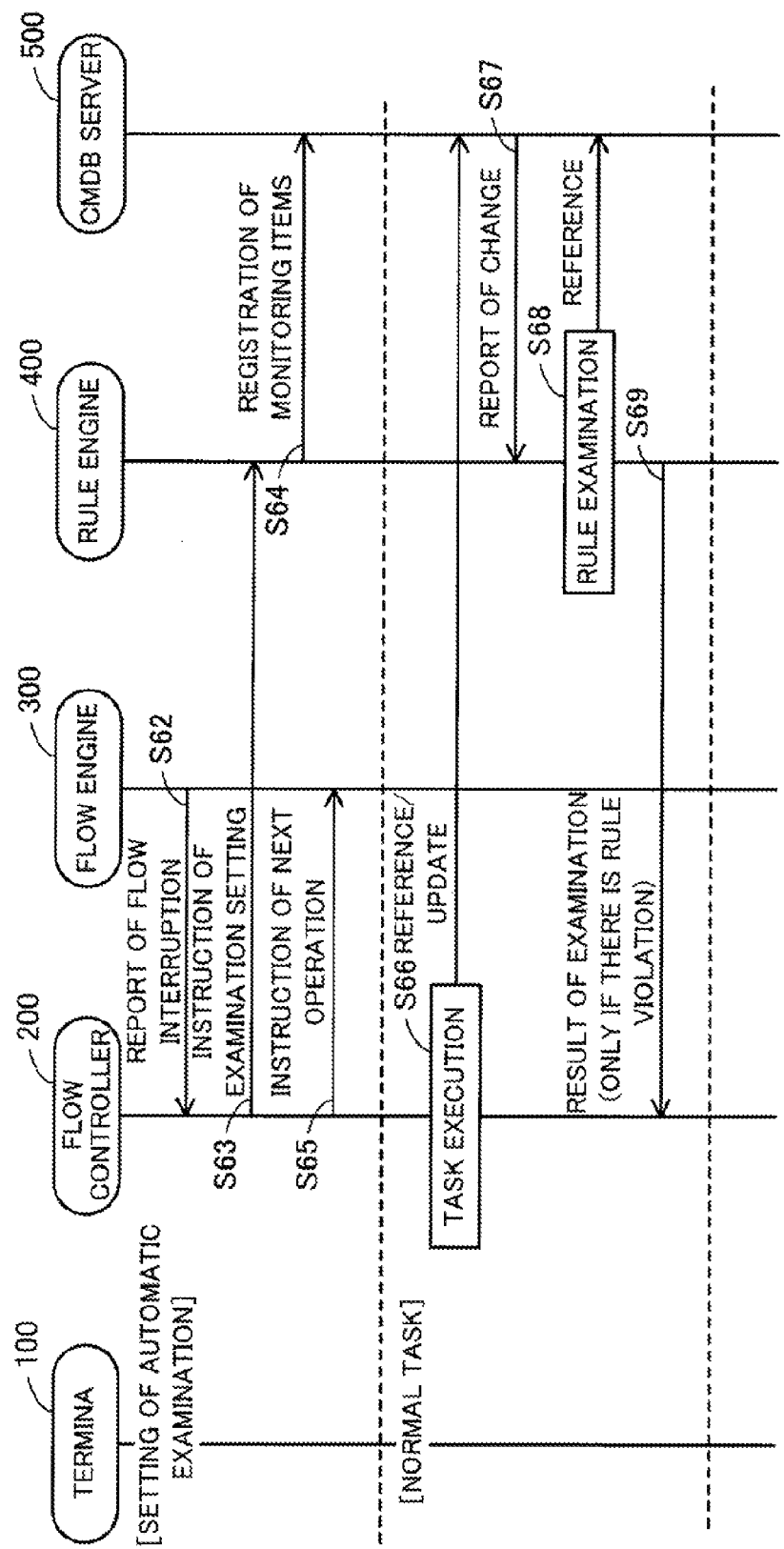
FIG. 20 is a second sequence diagram illustrating an example of the execution procedure of a workflow.

FIG. 20 is a second sequence diagram illustrating an example of the execution procedure of a workflow. In FIG. 20, Steps S62 to S65 are dedicated to a process enabling a rule examination to be performed in an appropriate manner at a timing other than a timing at which an examination task is performed. Those steps are carried out immediately after the preliminary examination. Steps S66 to S69 are performed at the time of executing a normal task.

(Step S62) After the examination task of the preliminary examination is completed, the flow engine 300 interrupts the workflow and reports the interruption to the flow controller 200.

(Step S63) The flow controller 200 instructs the rule engine 400 to configure a setting for enabling an automatic rule examination.

(Step S64) The rule engine 400 extracts items included in monitoring rules from the rule information, and reports the extracted items to the CMDB server 500. The CMDB server 500 registers the items reported by the rule engine 400 as items to be monitored.

(Step S65) After confirming completion of the registration of the monitoring items, the flow controller 200 instructs the flow engine 300 on the next operation to continue the workflow. The flow engine 300 resumes the interrupted workflow.

(Step S66) In the case where a task to be executed next is a normal task, the flow controller 200 performs a process defined in the flow information. Processes defined in the flow information include, for example, transmission of a stop command to an apparatus of the system resources 40, transmission of a command to install an updated program, and transmission of a restart command. At the time of executing a normal task, the flow controller 200 may refer to the configuration information held by the CMDB server 500, and may then update the configuration information.

(Step S67) The CMDB server 500 monitors whether configuration information of the monitoring items registered in Step S64 has been changed. The configuration information held by the CMDB server 500 may be changed by the flow controller 200, and may be changed based on information collected from the system resources 40. When detecting a change in the configuration information, the CMDB server 500 reports the change to the rule engine 400.

(Step S68) The rule engine 400 acquires the configuration information from the CMDB server 500 and evaluates the monitoring rules using the configuration information. In the case where a violation of a monitoring rule is detected, the rule engine 400 also evaluates lower-level rules of the monitoring rule.

(Step S69) When detecting a rule violation in Step S68, the rule engine 400 reports to the flow controller 200 that a rule violation has been detected, along with identification information of the rule against which a violation has been found. When not detecting a rule violation, the rule engine 400 may not make a report accordingly to the flow controller 200. The flow controller 200 instructs the flow engine 300 on termination of the workflow, for example, at a timing when the workflow is interrupted next time.

Figure 21:
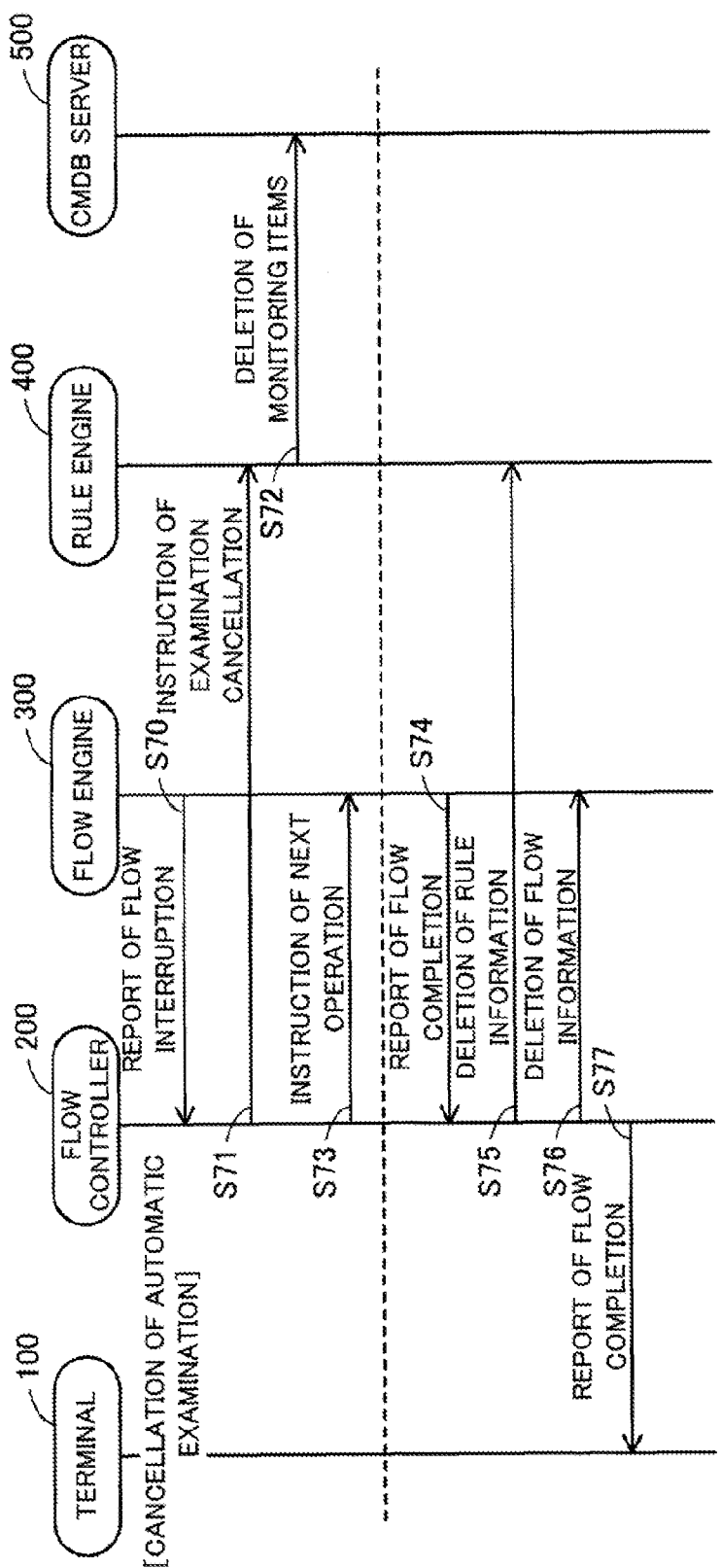
FIG. 21 is a third sequence diagram illustrating an example of the execution procedure of a workflow.

FIG. 21 is a third sequence diagram illustrating an example of the execution procedure of a workflow. In FIG. 21, Steps S70 to S73 are dedicated to a process of canceling the setting of an automatic examination. Those steps are carried out immediately before the post examination. Steps S74 to S77 are performed at the end of the workflow.

(Step S70) Before the examination task of the post examination is executed, the flow engine 300 interrupts the workflow and reports the interruption to the flow controller 200.

(Step S71) The flow controller 200 instructs the rule engine 400 to cancel the setting for enabling an automatic rule examination.

(Step S72) The rule engine 400 extracts items included in monitoring rules from the rule information, and reports the extracted items to the CMDB server 500. The CMDB server 500 deletes the registration of the items reported by the rule engine 400.

(Step S73) After confirming completion of the deletion of the monitoring items, the flow controller 200 instructs the flow engine 300 on the next operation to continue the workflow. The flow engine 300 resumes the interrupted workflow.

(Step S74) Once the workflow is completed (for example, the post examination task is completed), the flow engine 300 reports the completion to the flow controller 200. The workflow completion may be a normal termination or an abnormal termination.

(Step S75) The flow controller 200 instructs the rule engine 400 to delete the rule information. In response to the instruction, the rule engine 400 deletes the rule information.

(Step S76) The flow controller 200 instructs the flow engine 300 to delete the flow information. In response to the instruction, the flow engine 300 deletes the flow information.

(Step S77) The flow controller 200 reports to the terminal 100 either a normal or an abnormal termination as a result of the workflow execution.

According to the information processing system of the second embodiment, multiple rules are integrated in the light of the propagation relationship among items, and continuous examination is performed for the integrated rules. With this, it is possible to reduce the number of rule examinations, thereby reducing the examination load. Additionally, in the case where a violation is found against a higher-level rule, it is possible to determine the cause of a failure by examining multiple lower-level rules under the higher-level rule. Further, the workload of collecting the configuration information can be reduced by avoiding continuously collecting configuration information corresponding to the lower-level rules.

In addition, efficiency of rule examination is increased by registering monitoring items in the CMDB server 500, and then using a change in information of the registered items as a trigger for performing the rule examination. In addition, the rule editing screen is generated with reference to the configuration information held by the CMDB server 500 so that rules are described by specifying actually existing items. Providing such a rule editing screen to the user prevents description of incorrect rules as a result of specifying non-existent items. In addition, allowing the user to specify item classifications to thereby describe rules prevents some omissions of rule description.

Note that, as mentioned above, the workflow control and the rule examination according to the second embodiment are achieved by causing the terminal 100, the flow controller 200, the flow engine 300, the rule engine 400, and the CMDB server 500, each of which is a computer, to execute a program individually. The program may be recorded in a computer-readable recording medium (for example, the recording medium 33). Examples of the recording medium are a magnetic disk, an optical disk, a magneto-optical disk, and a semiconductor memory. The magnetic disk may be a FD or a HDD. The optical disk may be a CD, a compact disc-recordable (CD-R), a compact disc-rewritable (CD-RW), a DVD, a digital versatile disc-recordable (DVD-R), or a digital versatile disc-rewritable (DVD-RW).

In the case of distributing the program, a portable recording medium storing the program thereon, for example, is provided. In addition, the program may be stored in a storage device of another computer and then distributed via the network 50. Each of the above-mentioned computers stores, in a storage device (for example, the HDD 103), the program recorded in the portable recording medium or received from another computer, and reads the program from the storage device and executes the program. Note, however, that the program read from the portable recording medium or received from another computer via the network 50 may be executed directly.

According to one embodiment, it is possible to reduce the load of monitoring which uses information of multiple items.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A monitoring method for monitoring one or more apparatuses based on information on a plurality of items acquired from the one or more apparatuses, the monitoring method comprising:
   retrieving, by a processor when a first item and a second item are specified as examination targets, a third item based on the first item and the second item by referring to a storage device configured to store relationship information which indicates a relationship among the plural items, in which relationship the information on one item has an effect on the information on another item;
   adding, by the processor, the retrieved third item to the examination targets;
   examining, by the processor, the information on the third item whose information is associated with the information on the first item and the information on the second item;
   omitting, by the processor, examination of the information on the first item and the information on the second item in a case where no failure is detected in the examination of the information on the third item; and
   examining, by the processor, the information on the first item and the information on the second item in a case where a failure is detected in the examination of the information on the third item.

2. The monitoring method according to claim 1, further comprising:
   acquiring, by the processor, the information on the third item from the one or more apparatuses; and
   acquiring, by the processor, the information on the first item and the information on the second item from the one or more apparatuses after the failure is detected in the examination of the information on the third item.

3. The monitoring method according to claim 1, further comprising:
   causing, by the processor, a database apparatus, which collects at least part of the information on the plural items from the one or more apparatuses, to collect the information on the third item, and
   examining, by the processor when an update of the information on the third item in the database apparatus is detected, the updated information on the third item.

4. An information processing apparatus for monitoring one or more apparatuses based on information on a plurality of items acquired from the one or more apparatuses, the information processing apparatus comprising:
   a storage device configured to store relationship information which indicates a relationship among the plural items, in which relationship the information on one item has an effect on the information on another item; and a processor configured to perform a procedure including:
retrieving, when a first item and a second item are specified as examination targets, a third item based on the first item and the second item by referring to the relationship information stored in the storage device,
adding the retrieved third item to the examination targets,
examining the information on the third item whose information is associated with the information on the first item and the information on the second item,
omitting examination of the information on the first item and the information on the second item in a case where no failure is detected in the examination of the information on the third item, and
examining the information on the first item and the information on the second item in a case where a failure is detected in the examination of the information on the third item.

5. A computer-readable, non-transitory recording medium storing a monitoring program for monitoring one or more apparatuses based on information on a plurality of items acquired from the one or more apparatuses, the program causing a computer to perform a procedure comprising:
retrieving, when a first item and a second item are specified as examination targets, a third item based on the first item and the second item by referring to a storage device configured to store relationship information which indicates a relationship among the plural items, in which relationship the information on one item has an effect on the information on another item;
adding the retrieved third item to the examination targets;
examining the information on the third item whose information is associated with the information on the first item and the information on the second item;
omitting examination of the information on the first item and the information on the second item in a case where no failure is detected in the examination of the information on the third item; and
examining the information on the first item and the information on the second item in a case where a failure is detected in the examination of the information on the third item.

\* \* \* \* \*